United States Patent
Gamygin et al.

(10) Patent No.: US 11,501,652 B2
(45) Date of Patent: Nov. 15, 2022

(54) SYSTEMS, DEVICES, AND METHODS FOR CONVERSION OF CONSUMPTION OF AEROSOL-GENERATING ARTICLES

(71) Applicant: PHILIP MORRIS PRODUCTS S.A., Neuchâtel (CH)

(72) Inventors: Alexander Gamygin, Pully (CH); Carlo Francisco, Lausanne (CH); Scott Joseph Leonard, Urbandale, IA (US); Will Youngman, Lausanne (CH)

(73) Assignee: Philip Morris Products, S.A., Neuchâtel (CH)

( * ) Notice: Subject to any disclaimer, the term of this patent is extended or adjusted under 35 U.S.C. 154(b) by 698 days.

(21) Appl. No.: 16/337,119

(22) PCT Filed: Sep. 12, 2017

(86) PCT No.: PCT/IB2017/055506
§ 371 (c)(1),
(2) Date: Mar. 27, 2019

(87) PCT Pub. No.: WO2018/060798
PCT Pub. Date: Apr. 5, 2018

(65) Prior Publication Data
US 2019/0221130 A1    Jul. 18, 2019

(30) Foreign Application Priority Data
Sep. 28, 2016    (EP) ..................................... 16191220

(51) Int. Cl.
*A24F 40/65*    (2020.01)
*G09B 5/02*    (2006.01)
(Continued)

(52) U.S. Cl.
CPC ................. *G09B 5/02* (2013.01); *A24D 1/20* (2020.01); *A24F 40/53* (2020.01); *A24F 40/65* (2020.01);
(Continued)

(58) Field of Classification Search
CPC ....... G09B 5/02; G09B 19/0092; A24F 40/53; A24F 40/65; A24F 40/20; A24D 1/20; G06F 3/011
(Continued)

(56) References Cited

U.S. PATENT DOCUMENTS

2009/0320863 A1    12/2009    Fernando et al.
2015/0245664 A1    9/2015    Memari et al.
(Continued)

FOREIGN PATENT DOCUMENTS

CA    2731485 A1    8/2012
CN    102970885 A    3/2013
(Continued)

OTHER PUBLICATIONS

Singapore Search Report and Written Opinion issued for corresponding application SG 11201902272T, by the Singapore Patent Office, dated Apr. 7, 2020; 9 pgs.
(Continued)

*Primary Examiner* — Robert P Bullington
(74) *Attorney, Agent, or Firm* — Mueting Raasch Group

(57) ABSTRACT

Systems (200), devices (101), and methods are configured to generate and provide to users an indication representative of conversion of consumption from a first type of aerosol-generating article to a second type of aerosol-generating article. The systems (200), devices (101), and methods may be configured provide at least one first value representative of consumption of the first type of aerosol-generating article (2) such as, for example, combustion-style aerosol-generat-
(Continued)

ing articles (e.g., combustible cigarettes), and at least one second value representative of consumption of a second type of aerosol-generating article (4) such as, e.g., for example, a heated-type aerosol-generating articles (e.g., heat sticks), over a time period. The indication representative of conversion of consumption may be based on the at least one first value (2) and the at least one second value (4).

20 Claims, 8 Drawing Sheets

(51) Int. Cl.
*A24D 1/20* (2020.01)
*A24F 40/53* (2020.01)
*G06F 3/01* (2006.01)
*G09B 19/00* (2006.01)
*A24F 40/20* (2020.01)

(52) U.S. Cl.
CPC .......... *G06F 3/011* (2013.01); *G09B 19/0092* (2013.01); *A24F 40/20* (2020.01)

(58) Field of Classification Search
USPC ........................................................ 434/430
See application file for complete search history.

(56) References Cited

U.S. PATENT DOCUMENTS

| | | | |
|---|---|---|---|
| 2015/0327596 A1 | 11/2015 | Alarcon et al. | |
| 2019/0183185 A1* | 6/2019 | Manas | A24F 40/65 |

FOREIGN PATENT DOCUMENTS

| | | |
|---|---|---|
| CN | 103338664 A | 10/2013 |
| CN | 103653261 A | 3/2014 |
| CN | 104812260 A | 7/2015 |
| CN | 105361247 A | 3/2016 |
| JP | 2005-198538 A | 7/2005 |
| KR | 20120080477 | 7/2012 |
| KR | 101570106 B1 | 11/2015 |
| WO | WO 2009/127401 A1 | 10/2009 |
| WO | WO 2011/137453 A2 | 11/2011 |
| WO | WO 2012/085207 A1 | 6/2012 |
| WO | WO 2013/098398 A2 | 7/2013 |
| WO | WO 2014/058678 A1 | 4/2014 |
| WO | WO 2018/060798 A1 | 4/2018 |

OTHER PUBLICATIONS

Japanese Office Action for JP 2019-516484 issued by the Japanese Patent Office dated Jul. 1, 2021; 8 pgs. including Engl. Translation.
Extended European Search Report for EP 16191220.9, issued by the European Patent Office dated Jan. 16, 2017; 9 pgs.
International Search Report and Written Opinion for PCT/IB2017/055506, issued by the European Patent Office dated Dec. 1, 2017; 19 pgs.
International Preliminary Report on Patentability for PCT/IB2017/055506, issued by the European Patent Office dated Dec. 11, 2018; 22 pgs.
Dementyev, A., "Detection and analysis of smoking events with wrist-worn sensors," *Affective Computing*, Jan. 1, 2013; Retrieved from the Internet: URL:https://pdfs.semantischolar.org/fc9d/359c71f8254a2cfece6d6b01e4662bfbaeb8.pdf [retrieved on Oct. 8, 2018]: 6 pgs.
McClernon et al., "I am your Smartphone and I know You are About to Smoke: The Application of Mobile Sensing and Computer Approaches to Smoking Research and Treament," *Nicotine & Tobacco Research*, May 23, 2013; 15(10):1651-1654.
Parate et al., "RisQ: recognizing smoking gestures with inertial sensors on a wristband," *Mobile Systems, Applications, and Services*, Jan. 1, 2014; 149-161.
Chinese First Office Action for CN 201780054858.8, issued by the China National Intellectual Property Administration, dated Jan. 21, 2021; 21 pgs. including English translation.

\* cited by examiner

Fig. 8

HSinit = 0
CCinit = 18

| Day | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| Synchs | y | y | y | y | y | y | y | y | y | y | y | y | y | y | y | y | y | y | y | y | y |
| HScur | 10 | 11 | 15 | 15 | 14 | 13 | 10 | 6 | 17 | 15 | 12 | 12 | 16 | 4 | 12 | 9 | 9 | 6 | 11 | 2 | 9 |
| CCcur | | | | 3 | | | 5 | 12 | 1 | 3 | 6 | 3 | 2 | 14 | 3 | 6 | 9 | 12 | 7 | 10 | 10 |
| CCpred | 8 | 7 | 3 | 3 | 4 | 5 | 8 | 12 | 1 | 3 | 6 | 6 | 2 | 14 | 6 | 9 | 9 | 12 | 7 | 16 | 9 |
| CSraw | 0.00 | 0.56 | 0.61 | 0.83 | 0.83 | 0.78 | 0.72 | 0.67 | 0.33 | 0.94 | 0.83 | 0.67 | 0.80 | 0.89 | 0.22 | 0.80 | 0.50 | 0.50 | 0.33 | 0.61 | 0.17 |
|  | Low | Mid | Mid | High | High | High | High | High | Mid | High | High | High | High | High | Low | High | Mid | Mid | Mid | Mid | Low |
| CSorig | 0.00 | 0.56 | 0.61 | 0.83 | 0.83 | 0.67 | 0.74 | 0.78 | 0.78 | 0.72 | 0.72 | 0.74 | 0.72 | 0.77 | 0.84 | 0.77 | 0.76 | 0.70 | 0.60 | 0.44 | 0.54 |
|  | Low | Mid | Mid | High | High | High | High | High | High | High | High | High | High | High | High | High | High | High | Mid | Mid | Mid |
| CSactual | 0.56 | 0.61 | 0.83 | 0.83 | 0.78 | 0.72 | 0.67 | 0.33 | 0.94 | 0.83 | 0.67 | 0.80 | 0.89 | 0.22 | 0.80 | 0.50 | 0.50 | 0.33 | 0.61 | 0.17 | 0.47 |
|  | Mid | Mid | High | High | High | High | High | Mid | High | High | High | High | High | Low | High | Mid | Mid | Mid | Mid | Low | Mid |

Fig. 9

HSinit = 0
CCinit = 18

| Day | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| Synchs |  |  |  |  |  |  | y |  |  | y |  |  |  |  | y |  |  |  |  | y |  |
| HScur | 10 | 11 | 15 | 15 | 14 | 13 | 10 | 6 | 17 | 15 | 12 | 12 | 16 | 4 | 12 | 9 | 9 | 6 | 11 | 2 | 9 |
| CCcur |  |  |  | 3 |  |  | 5 |  |  | 3 |  |  |  |  | 3 |  |  |  |  | 10 |  |
| CCpred | 8 | 7 | 3 | 3 | 4 | 5 | 8 | 12 | 1 | 3 | 6 | 6 | 2 | 14 | 6 | 9 | 9 | 12 | 7 | 16 | 9 |
| CSraw | 0.00 | 0.00 | 0.61 | 0.83 | 0.83 | 0.83 | 0.72 | 0.72 | 0.72 | 0.94 | 0.94 | 0.94 | 0.94 | 0.94 | 0.22 | 0.22 | 0.22 | 0.22 | 0.22 | 0.61 | 0.17 |
|  | Low | Low | Mid | High | High | High | High | High | High | High | High | High | High | High | Low | Low | Low | Low | Low | Mid | Low |
| CSorig | 0.00 | 0.00 | 0.61 | 0.83 | 0.83 | 0.48 | 0.76 | 0.80 | 0.80 | 0.76 | 0.76 | 0.80 | 0.87 | 0.94 | 0.94 | 0.94 | 0.70 | 0.46 | 0.22 | 0.22 | 0.22 |
|  | Low | Low | Mid | High | Mid | High | High | High | High | High | High | High | High | High | High | High | High | Mid | Low | Low | Low |
| CSactual | 0.56 | 0.61 | 0.83 | 0.83 | 0.78 | 0.72 | 0.67 | 0.33 | 0.94 | 0.83 | 0.67 | 0.80 | 0.89 | 0.22 | 0.80 | 0.50 | 0.50 | 0.33 | 0.61 | 0.17 | 0.47 |
|  | Mid | Mid | High | High | High | High | High | Mid | High | High | High | High | High | Low | High | Mid | Mid | Mid | Mid | Low | Mid |

SYSTEMS, DEVICES, AND METHODS FOR CONVERSION OF CONSUMPTION OF AEROSOL-GENERATING ARTICLES

This application is the § 371 U.S. National Stage of International Application No. PCT/IB2017/055506, filed 12 Sep. 2017, which claims the benefit of European Application No. 16191220.9, filed 28 Sep. 2016, the disclosures of which are incorporated by reference herein in their entireties.

This invention relates to systems, devices, and methods for use in conversion from consumption of one type of aerosol-generating article to consumption of another type of aerosol-generating article.

Smokers of conventional cigarettes may wish to convert to consumption of devices that generate aerosol without combustion from, for example, an article that includes a tobacco substrate. For example, aerosol generated from articles that include a tobacco substrate that is heated, but not combusted, contains lower amounts or concentrations of certain smoke constituents than smoke or aerosol produced from combustion and pyrolytic degradation of tobacco in conventional cigarettes.

In one known type of aerosol-generating device, an aerosol is generated by the transfer of heat from a heat source to a physically separate aerosol-generating article that includes, for example, a substrate containing tobacco. The device is configured such that the heat source does not combust the substrate. During use, volatile compounds are released from the aerosol-generating substrate by heat transfer from the heat source and entrained in air drawn through the aerosol-generating article. As the released compounds cool, they condense to form an aerosol that is inhaled by the user.

Further, aerosol-generating devices may be configured to include data transmission functionality such as, for example, wireless data transmission functionality, to transfer data to and from the aerosol-generating devices. Published PCT patent application WO-2009/127401A1 discloses an electrically heated smoking system configured to interface with electrical hardware and operable to establish a communications link with a remote host such that, for example, smoking behaviour information may be uploaded to the remote host. As is typical for aerosol-generating devices of this type, this arrangement includes hardware that comprises a limited set of software-supporting components. In this type of arrangement, the available data processing ability of the aerosol-generating device is low.

Conversion of consumption from combustible aerosol-generating articles such as, for example, combustible cigarettes, to aerosol-generating articles that are heated but not combusted may be challenging for users. For example, it may be inconvenient for users to accurately track the amount of their consumption of combustible aerosol-generating articles the amount of their consumption of aerosol-generating articles that are heated but not combusted. Further, it may be problematic for users to determine the state of their progress in converting from combustible aerosol-generating articles to aerosol-generating articles that are heated but not combusted. Still further, users may need additional encouragement or reinforcement during their conversion from combustible aerosol-generating articles to aerosol-generating articles that are heated but are not combusted. Yet still further, users may also desire the presentation of information related to the conversion process that, for example, may be helpful for the users' conversion.

One object of examples of the invention is to provide users a fast and convenient way to track their conversion from a first type of aerosol-generating article such as, for example, combustion-type aerosol-generating article (e.g., combustible cigarettes) to a second type of aerosol-generating article such as, for example, heated-type aerosol-generating articles (e.g., heat sticks for use in heat but not combustion-type aerosol-generating devices).

However, as described above, typically aerosol-generating devices of the type that heat but do not combust an aerosol forming substrate—possibly an aerosol forming substrate that is part of a separate aerosol-generating article—include hardware, which comprises a limited set of software-supporting components. This is for many reasons. Firstly, they need to be very physically small. They are similar in size to only a portion of a conventional cigarette to give a similar sensation to a conventional cigarette in order to gain wide acceptance by smokers of conventional combustible cigarettes. Therefore, the hardware on which software can be embedded needs to be very compact and this limits the functionality available. The aerosol-generating article hardware is usually in the form of an application-specific integrated circuit (ASIC), or a processor with embedded software that is customised for use in an aerosol-generating article. The ASIC typically performs essential safety functions such as to prevent overheating of the article. Power available to the ASIC is very limited. This is because the compact form of the aerosol-generating device limits space available for a battery or batteries and relatively large amounts of power are required for electrical heating of the aerosol-generating substrate from the battery or batteries. Altogether, this severely limits the available data processing capacity of the ASIC.

Furthermore, the compact dimensions of the aerosol-generating article provide very limited space for a user interface. Usually, there is space for no more user interface features than an on/off switch, and several types of devices do not even have an on/off switch, but are puff activated.

The inventors of the present patent application have appreciated that by using a second separate computer to the aerosol-generating article (such as a general purpose computer, for example, a smart phone) that adequate data processing capacity can be provided by the computer with appropriate software or an app to process data from the aerosol-generating article to provide at least one indication representative of conversion of consumption from a first type of aerosol-generating article to the second type of aerosol-generating article. Such devices usually have a display such as a liquid crystal display and, significantly, the inventors of the present patent application have appreciated that this can be used to readily provide relevant information to a user.

Furthermore, advantageously, the software or app on a general purpose computer such as a smart phone can be readily updated from a central data store such as a remote server or Cloud server over the Internet. In this way, functionality of the software or app on the general purpose computer can be conveniently changed or improved. The compact dimensions and limited power available to the aerosol-generating article mean that a ready connection to the Internet and particularly a wireless connection to the Internet is not available.

As used herein, a "combustible aerosol-generating article" or "combustion-type aerosol-generating article" is an article that is configured to combust an aerosol-generating substrate such as, for example, a tobacco rod to produce an aerosol that may be inhaled by a consumer. Examples of combustible aerosol-generating articles include cigarettes, cigars, and cigarillos.

As used herein, a "heated-type aerosol-generating article" is an aerosol-generating article that comprises an aerosol-generating substrate and is configured for use with an aerosol-generating device that is configured to heat, but not combust, the aerosol-generating substrate. One example of a heated-type aerosol-generating article are the IQOS heat sticks, also known as MARLBORO HEATSTICKS, from Phillip Morris International for use in an IQOS, heat not burn, aerosol-generating device, also from Phillip Morris International.

Another object of examples of the invention is to generate information related to the conversion process so as to provide users with one or more indications of the state of their progress in converting from the first type of aerosol-generating article to the second type of aerosol-generating article. Further, another object of examples of the invention is to provide one or both of useful encouragement and reinforcement to users to assist in their conversion from usage of the first type of aerosol-generating article to the second type of aerosol-generating article. Still further, another object of examples of the invention is to present information to users that is relevant to the consumption conversion process, and in some embodiments, information that is relevant to the particular step or stage of the consumption conversion process.

In one aspect there is provided a method comprising: providing at least one first value representative of consumption of a first type of aerosol-generating article over at least one time period; providing at least one second value representative of consumption of a second type of aerosol-generating article over the at least one time period, wherein the first type of aerosol-generating article is different than the second type of aerosol-generating article; and generating at least one indication representative of conversion of consumption from the first type of aerosol-generating article to the second type of aerosol-generating article based on the at least one first value and the at least one second value.

The method may be a computerized method on which each of the steps of the method are carried out on a computer. The inventors of the present application have appreciated that general purpose computers such as smart phones, desktop computers, laptop computers and tablet computers are now ubiquitous and that they may form a platform or technical solution for an arrangement for conversion from consumption of one type of aerosol-generating article to consumption of another type of aerosol-generating article. This is advantageous as they can be expected to be always near or on the person trying to convert their consumption. The arrangement described provides a technical solution to the technical problem of how to implement such an arrangement on a computer. The computerized method addresses the technical or technological problem particular to implementation on a computer that is specific to this technological environment. Computers are good at carrying out some tasks, but poor at other tasks. The technical solution disclosed takes into account tasks that general purpose computers are good at carrying out to provide a user interface that is easy for a person to comprehend to use in helping with conversion from consumption of one type of aerosol-generating article to consumption of another type of aerosol-generating article. The method, system, computer program and computer program product described significantly help in conversion of consumption of one type of aerosol-generating article to consumption of another type of aerosol-generating article.

In one aspect there is provided a computer program product comprising a non-transitory computer readable medium having program code portions stored thereon, the program code portions configured, when said program product is run on a computer or network device, to: generate at least one indication representative of conversion of consumption from a first type of aerosol-generating article to a second type of aerosol-generating article based on at least one first value representative of consumption of a first type of aerosol-generating article over at least one time period and at least one second value representative of consumption of a second type of aerosol-generating article over the at least one time period, wherein the first type of aerosol-generating article is different than the second type of aerosol-generating article; and deliver the at least one indication representative of conversion of consumption from the first type of aerosol-generating article to the second type of aerosol-generating article to a user.

In one aspect there is provided a computer program configured to: generate at least one indication representative of conversion of consumption from a first type of aerosol-generating article to a second type of aerosol-generating article based on at least one first value representative of consumption of a first type of aerosol-generating article over at least one time period and at least one second value representative of consumption of a second type of aerosol-generating article over the at least one time period, wherein the first type of aerosol-generating article is different than the second type of aerosol-generating article; and deliver the at least one indication representative of conversion of consumption from the first type of aerosol-generating article to the second type of aerosol-generating article to a user.

In one aspect there is provided a user interface device comprising: a display comprising a graphical user interface configured to present at least one indication representative of conversion of consumption from a first type of aerosol-generating article to a second type of aerosol-generating article; and a controller comprising one or more processors and operably coupled to the display, wherein the controller is configured to: generate at least one indication representative of conversion of consumption from the first type of aerosol-generating article to the second type of aerosol-generating article based on at least one first value representative of consumption of a first type of aerosol-generating article over at least one time period and at least one second value representative of consumption of a second type of aerosol-generating article over the at least one time period, wherein the first type of aerosol-generating article is different than the second type of aerosol-generating article, and display, on the graphical user interface, the at least one indication representative of conversion of consumption from the first type of aerosol-generating article to the second type of aerosol-generating article.

In one aspect there is provided a system comprising: a user interface device as described above; an aerosol-generating apparatus configured to use the second type of aerosol generating article to generate aerosol, wherein the aerosol-generating apparatus comprises: a communication interface to transfer data to and from the user interface device; and a controller comprising one or more processors, wherein the controller is configured to: determine at least one second value representative of consumption of the second type of aerosol-generating article over at least one time period using the aerosol-generating apparatus, and transmit the at least one second value representative of consumption of the second type of aerosol-generating article over the at least one time period to the user interface device.

Incorporating the user interface device with the aerosol-generating apparatus is a technical solution that takes into account the technological environment. It is a realisation by the inventors that by including the user interface device with the aerosol-generating apparatus it is particularly easy for a user to see how their conversion from one type of aerosol-generating article to consumption of another type of aerosol-generating article is progressing.

The aerosol-generating apparatus may comprise: an aerosol-generating device comprising a power supply; and a host device comprising an interface to be operably coupled to the aerosol-generating device to at least recharge the power supply of the aerosol-generating device.

The host device may comprise the communication interface and the controller.

The controller of the aerosol-generating apparatus may be further configured to receive data associated with the at least one second value representative of consumption of the second type of aerosol-generating article over the at least one time period from the aerosol-generating device when the aerosol-generating device is operably coupled to the host device.

The aerosol-generating device may comprise the communication interface and the controller.

The time period may be one day. This time period is such that enough data can be stored to assist in conversion from consumption of one type of aerosol-generating article to consumption of another type of aerosol-generating article while considering the restricted memory capacity of some computers such as smart phones.

Generating the at least one indication representative of conversion of consumption from the first type of aerosol-generating article to the second type of aerosol-generating article may comprise generating a rate of conversion of consumption from the first type of aerosol-generating article to the second type of aerosol-generating article. This technical solution is particularly advantageous when the first type of aerosol-generating article is a conventional smoking article or combustible smoking-article such as a cigarette, cigar or cigarillo as these articles do not have ready electronic connectivity.

The at least one second value representative of consumption of a second type of aerosol-generating article over the at least one time period may comprise: an initial second value representative of consumption of the second type of aerosol-generating article over an initial time period, and a plurality of subsequent second values representative of consumption of the second type of aerosol-generating article over a plurality of subsequent time periods; and wherein the at least one first value representative of consumption of the first type of aerosol-generating article over the at least one time period comprises: an initial first value representative of consumption of the first type of aerosol-generating article over an initial time period, and a plurality of subsequent first values representative of consumption of the first type of aerosol-generating article over a plurality of subsequent time periods, wherein a generated subsequent first value of the plurality of subsequent first values is generated based on the initial first value, the initial second value, and a subsequent second value of the plurality of subsequent second values corresponding to the generated subsequent first value.

The initial first value may be input by a user.

Generating the at least one indication representative of conversion of consumption from the first type of aerosol-generating article to the second type of aerosol-generating article may comprise generating a rate of conversion of consumption from the first type of aerosol-generating article to the second type of aerosol-generating article by dividing a current subsequent second value by the sum of the current subsequent first value and a corresponding current subsequent second value. This is a computationally efficient method to generate the at least one indication representative of conversion of consumption from the first type of aerosol-generating article to the second type of aerosol-generating article.

The at least one indication representative of conversion of consumption from the first type of aerosol-generating article to the second type of aerosol-generating article may comprise an aggregate rate of conversion of consumption from the first type of aerosol-generating article to the second type of aerosol-generating article based on at least a rolling average of a plurality of previous rates of conversion of consumption from the first type of aerosol-generating article to the second type of aerosol-generating article from a plurality of previous time periods. This is a computationally efficient method to generate the at least one indication representative of conversion of consumption from the first type of aerosol-generating article to the second type of aerosol-generating article.

The at least one indication representative of conversion of consumption from the first type of aerosol-generating article to the second type of aerosol-generating article may comprise a graphical indication representative of conversion of consumption from the first type of aerosol-generating article to the second type of aerosol-generating article.

The graphical indication may comprise a bar-type graph. This is a particularly user friendly indication.

The method may further comprise or the controller may be further configured to execute generating a textual reinforcement message based on at least the at least one indication representative of conversion of consumption to convey encouragement to a user to regarding the conversion of consumption from the first type of aerosol-generating article to the second type of aerosol-generating article.

The method may further comprise or the controller may further be configured to execute generating informational content related to conversion of consumption from the first type of aerosol-generating article to the second type of aerosol-generating article based on at least the at least one indication representative of conversion of consumption to convey additional information to a user for assistance in conversion of consumption from the first type of aerosol-generating article to the second type of aerosol-generating article.

In various aspects, the invention provides systems, devices, and methods that are configured to provide at least one first value representative of consumption of a first type of aerosol-generating article such as, for example, combustion-style aerosol-generating articles (e.g., combustible cigarettes), over at least one time period and provide at least one second value representative of consumption of a second type of aerosol-generating article such as, e.g., for example, a heated-type aerosol-generating articles (e.g., heat sticks) over the at least one time period, where the first type of aerosol-generating article is different than the second type of aerosol-generating article. The invention further provides systems, devices, and methods that are configured to generate and provide to users at least one indication representative of conversion of consumption, or consumption conversion, from the first type of aerosol-generating article to the second type of aerosol-generating article based on at least the at least one first value representative of consumption of a first type of aerosol-generating article and the at least one second value representative of consumption of a second type of aerosol-generating article.

In various aspects, the invention further provides a user interface device comprising a display and a controller comprising one or more processors and operably coupled to the display. The display may comprise a graphical user interface configured to present at least one indication representative of conversion of consumption from the first type of aerosol-generating article to the second type of aerosol-generating article.

In various aspects, the invention further provides an aerosol-generating apparatus configured to use the second type of aerosol generating article to generate aerosol. The aerosol-generating apparatus comprises a communication interface to transfer data to and from the user interface device and a controller comprising one or more processors. The controller is configured to at least determine at least one second value representative of consumption of the second type of aerosol-generating article over at least one time period using the aerosol-generating apparatus and transmit the at least one second value representative of consumption of the second type of aerosol-generating article over the at least one time period to a user interface device.

Various aspects of the systems, devices, and methods according to the present invention may provide one or more advantages relative to currently available aerosol-generating articles and associated systems. For example, the indications representative of the users' conversion of consumption from the first type of aerosol-generating article to the second type of aerosol-generating article may be advantageous because the indications provide a way that users can track the progress of their conversion as well as provide reinforcement or encouragement to the users. Further, for example, the indications representative of the users' conversion of consumption may be advantageous because the indications provide a snapshot, or overview, of the progress of the users' conversion.

Still further, for example, the user interface device may be advantageous in that the display provides a way to present information to users that is relevant to the consumption conversion process including encouragement and reinforcement without being obtrusive to the users. Yet still further, for example, the communication interface of the aerosol-generating apparatus is advantageous because it provides a fast, convenient, and reliable process, or method, to provide usage data, such as, for example, at least one second value representative of consumption of the second type of aerosol-generating article to a user interface device.

Yet still further, the invention proposes to collect input data from the user about his consumption habits, and return as output a rate of conversion between the two types of smoking articles. As it will be fully explained in the following, input data may be collected automatically, without specific input from the user, or the user may be directly queried about his consumption. Moreover, data may also be estimated based on predefined formulas. The rate of conversion may be periodically calculated and delivered to the user. Advantageously, additional content may be generated based on the current value of conversion. For instance, if the rate of conversion is always very low, this may trigger the delivery of more educational content to inform the user about the benefits of usage of aerosol-generating systems as opposed to conventional cigarettes.

The present invention relates to systems, devices, and methods for use in conversion of consumption of aerosol-generating articles. More specifically, the illustrative systems, devices, and methods may be used by a user that intends to convert from a first type of aerosol-generating article such as, for example, combustion-type aerosol-generating articles, to a second type of aerosol-generating article such as, e.g., heated-type aerosol-generating articles. To do so, the systems, devices, and methods may configured to take, or be provided with, data with respect to the consumption of the first type of aerosol-generating article and data with respect to the consumption of the second type of aerosol-generating article, and then use the consumption data to generate, or produce, information or output data that may be useful to the user in attempting to convert.

While much of the discussion presented in this disclosure relates to conversion from consumption of combustion-type aerosol-generating articles to consumption of heated-type aerosol-generating articles, it will be understood that the systems, devices and methods described in this disclosure are applicable from conversion of any first type of aerosol-generating article to any second type of aerosol-generating article. Examples of aerosol-generating articles other than combustion-type aerosol-generating articles and heated-type aerosol-generating articles include aerosol-generating articles that include liquid aerosol-generating substrates (such as e-liquids for e-cigarettes) and aerosol-generating articles that include substrates for inhalation of powder.

Preferably, the data with respect to the consumption of the first type of aerosol-generating article includes at least one first value such as, for example, an amount, or number, of the first type of aerosol-generating articles that were consumed by the user during, or over, a particular time period such as one day. Likewise, preferably, the data with respect to the consumption of the second type of aerosol-generating article includes at least one second value such as, for example, an amount, or number, of the second type of aerosol-generating articles that were consumed by the user during, or over, the same particular time period. As described further herein with respect to the illustrative systems, apparatus, and devices, the data with respect to the consumption of the first and second type of aerosol-generating articles may be provided, or gathered, in various ways. For example, a user may input, or enter, an amount, or number, of the first and/or second types of aerosol-generating articles consumed by the user into a user interface device. In one or more embodiments, a user may be requested, or prompted, by a user interface device to input, or enter, one or both amounts of first and second types of aerosol-generating articles consumed over a period of time. Further, for example, an amount, or number, of the second type of aerosol-generating articles consumed by a user may be automatically transferred (e.g., wireless or wired data transmission) from aerosol-generating device to another device or system such as a user interface device.

It is to be understood that the time period over which the data with respect to the consumption of the first and second type of aerosol-generating articles is provided, or gathered, may include time periods greater than, less than, or equal to a day. Preferably, the time period is a single day. However, in other embodiments, the time period may be greater than or equal to about 1 hour, greater than or equal to about 2 hours, greater than or equal to about 6 hours, greater than or equal to about 12 hours, greater than or equal to about 18 hours, greater than or equal to about 22 hours, greater than about 1 day, greater than or equal to about 2 days, or greater than or equal to about 1.5 weeks. Still, in other embodiments, the time period may be less than or equal to about 3 months, less than or equal to about 1 month, less than or equal to about 2 weeks, less than or equal to about 1 week, or less than or equal to about 5 days.

Further, it is to be understood that the illustrative systems, devices, and methods may be configured to provide, or gather, data with respect to the consumption of the first and second type of aerosol-generating articles over multiple, or a plurality of, time periods. Initially, the illustrative systems, devices, and methods may be configured to request an initial first value representative of consumption of the first type of aerosol-generating article over an initial time period. For example, a user interface device may present a query, or question, asking a user how many of the first type of aerosol-generating articles that the user has consumed over the initial time period. More specifically, for example, the user interface device may provide a dialog including selectable buttons to increase or decrease an amount of the first type of aerosol-generating articles that a user has consumed of the initial time period.

Preferably, the illustrative systems, devices, and methods may estimate, or predict, subsequent first values representative of consumption of the first type of aerosol-generating article for subsequent time periods based on other data such as, for example, the initial first value and other values with respect to the second values representative of consumption of the second type of aerosol-generating article.

In one or more embodiments, after the initial entry of the initial first value representative of consumption of the first type of aerosol-generating article over the initial time period, subsequent first values representative of consumption of the first type of aerosol-generating article over the subsequent time periods may be also be provided by the illustrative systems, devices, and methods. For example, a user may input, or enter, (e.g., using an illustrative user interface device) the amount of the first type of aerosol-generating article that the user has consumed over each subsequent time period. When a user may fail or forget to input, or enter, subsequent first values representative of consumption of the first type of aerosol-generating article over the subsequent time periods into a user interface device, the illustrative systems, devices, and methods may estimate, or predict, subsequent first values as described herein.

Additionally, the data with respect to the consumption of the first and second types of aerosol-generating articles may be provided, or gathered, over multiple time periods so as to, for example, provide trends of the rate of conversion of consumption over longer periods of time than a single time period. The data with respect to the consumption of the second type of aerosol-generating articles may be gathered manually and/or automatically over the plurality of time periods.

Initially, since the user is presumably beginning their conversion from the first type of aerosol-generating article to the second type of aerosol-generating article, an initial second value representative of consumption of the second type of aerosol-generating article over an initial time period is 0. However, if a user begins using the illustrative systems, devices, and methods after the user has begun conversion from the first type of aerosol-generating article to the second type of aerosol-generating article, the initial second value representative of consumption of the second type of aerosol-generating article over the initial time period may be inputted, or entered, by a user or transferred from aerosol-generating apparatus to a user interface device.

Subsequent second values representative of consumption of the second type of aerosol-generating article over the subsequent time periods may be also be provided by the illustrative systems, devices, and methods. For example, a user may input, or enter, (e.g., using an illustrative user interface device) the amount of the second type of aerosol-generating article that the user has consumed over each subsequent time period. The illustrative systems, devices, and methods may periodically, request, or prompt, a user to input, or enter, one or both amounts of first and second types of aerosol-generating articles consumed over subsequent time periods. Further, for example, an illustrative aerosol-generating apparatus may transfer the amount of the second type of aerosol-generating article that the user has consumed over each subsequent time period to a user interface device. The transfer from the aerosol-generating apparatus to the user interface device may occur periodically such as, for example, once every time period, or more intermittently depending on the connectivity functionality as described further herein.

As noted herein, the illustrative systems, devices, and methods may preferably estimate, or predict, subsequent first values representative of consumption of the first type of aerosol-generating article for subsequent time periods based on other data such as, for example, the initial first value and other values with respect to the second values representative of consumption of the second type of aerosol-generating article. Preferably, if a current subsequent second value is not inputted by a user, a generated subsequent first value is generated based on the initial first value representative of consumption of the first type of aerosol-generating article over the initial time period, the initial second value representative of consumption of the second type of aerosol-generating article over the initial time period, and a subsequent second value corresponding to (e.g., corresponding to the same time period as) the generated subsequent first value. More specifically, the generated subsequent first value may be calculated by subtracting the corresponding, or current, subsequent second value from the sum of the initial first and second values. For example, if the initial first value is 20 (e.g., representing the consumption of 20 conventional cigarettes), the initial second value is 0 (e.g., representing zero consumption of heated aerosol-generating articles), and the present, or current, subsequent second value is 15 (e.g., representing consumption of 15 heated aerosol-generating articles), the generated subsequent second value is 5 (5=20+0−15). In other words, the illustrative systems, devices, and methods may estimate, or predict, that the user has consumed 5 aerosol-generating articles of the first type based on the amount of aerosol-generating articles of the second type that were consumed over the same time period.

The illustrative systems, devices, and methods may generate at least one indication representative of conversion of consumption from the first type of aerosol-generating article to the second type of aerosol-generating article based on the data with respect to the consumption of the first type of aerosol-generating articles and data with respect to the consumption of the second type of aerosol-generating article. In other words, the data with respect to the consumption of the first and second types of aerosol-generating articles may be used to determine, or calculate, at least one indication representative of conversion.

Preferably, the at least one indication representative of conversion includes a rate of conversion of consumption from the first type of aerosol-generating article to the second type of aerosol-generating article. The rate of conversion may be expressed, for example, as a percentage of consumption of the first type of aerosol-generating article out of all of the aerosol-generating articles used, or consumed, by a user for a particular time period such as one day. In other words, a rate of conversion of consumption from the first type of aerosol-generating article to the second type of aerosol-generating article may be generated, or calculated, by dividing a current subsequent second value by the sum of the current subsequent second value and a corresponding current subsequent first value. For example, if a user smoked 15 aerosol-generating articles of the first type and 5 aerosol-generating articles of the second type over the course of a day, the rate of conversion of consumption would be 25% (5 divided by the sum of 5 and 15).

Further, the rate of conversion of consumption from the first type of aerosol-generating article to the second type of aerosol-generating article may be expressed graphically as a graphical indication such as, for example, a bar-type graph, a pie-type graph, a Venn diagram, a "stoplight," and the like. Preferably, a user may be able to glance at the graphical indication to be efficiently and effectively apprised of the user's status of conversion from the first type of aerosol-generating article to the second type of aerosol-generating article. For instance, the rate of conversion of consumption from the first type of aerosol-generating article to the second type of aerosol-generating article may be expressed as a bar-type graph extending from a first end representing 0% to a second end representing 100%. In the previous example, the bar graph may extend one quarter of the way across the bar-type graph to indicate that the rate of conversion of consumption is 25%.

Further, for instance, a particular colour may be associated with various rates of conversion of consumption, which may be used in the graphical indication of the rate of conversion of consumption from the first type of aerosol-generating article to the second type of aerosol-generating article. For example, if a user's rate of conversion is less than about 33%, the colour associated with the rate of conversion may be red to indicate a "low" rate of conversion from the first type of aerosol-generating article to the second type of aerosol-generating article. Further, if a user's rate of conversion is between about 34% and about 66%, the colour associated with the rate of conversion may be yellow to indicate a "medium" rate of conversion from the first type of aerosol-generating article to the second type of aerosol-generating article. Still further, if a user's rate of conversion is between about 67% and about 94%, the colour associated with the rate of conversion may be green to indicate a "high" rate of conversion from the first type of aerosol-generating article to the second type of aerosol-generating article. Still further, if a user's rate of conversion is between about 95% and about 100%, the colour associated with the rate of conversion may be dark green to indicate that a user has "converted" from the first type of aerosol-generating article to the second type of aerosol-generating article.

As noted herein, data acquisition of the values representative of the consumption of the first and second types of aerosol-generating article may occur intermittently depending on, for example, how often a user inputs such values, how often an aerosol-generating apparatus communicates with a user interface device, how often an aerosol-generating device is operatively coupled to a host device, and the like. Preferably, the invention includes one or more processes to compensate for intermittent data acquisition. For example, when data acquisition of the first value representative of the consumption of the first type of aerosol-generating articles occur intermittently, the illustrative systems, devices, and methods may use an estimated, or predicted subsequent first values representative of consumption of the first type of aerosol-generating article for subsequent time periods, which as described herein may be based on other data such as, for example, the initial first value and other values with respect to the second values representative of consumption of the second type of aerosol-generating article.

Further, for example, when data acquisition of the second value representative of the consumption of the second type of aerosol-generating articles occurs intermittently, the generation of the at least one indication representative of conversion of consumption from the first type aerosol-generating article to the second type of aerosol-generating article may preferably be adjusted for the intermittent data acquisition. For example, if the illustrative systems, devices, and methods have not received, or been provided, a current subsequent second value representative of consumption of the second type of aerosol-generating article, the indication representative of conversion of consumption may be set to the previous indication representative of conversion of consumption from the previous time period (e.g., day). In this way, a user will not be provided with an indication of conversion of consumption that may be based on incomplete and/or inaccurate data. Instead, the indication of conversion of consumption will be simply based on previous data.

Additionally, preferably, the at least one indication representative of conversion may include an aggregate rate of conversion of consumption from the first type of aerosol-generating article to the second type of aerosol-generating article based on at least a rolling average of a plurality of previous rates of conversion of consumption from the first type of aerosol-generating article to the second type of aerosol-generating article from a plurality of previous time periods. More specifically in one embodiment, the plurality of previous rates of conversion of consumption used in the rolling average may include the previous five time periods. Further, preferably and more specifically, in one embodiment, the plurality of previous rates of conversion of consumption used in the rolling average may exclude at least one outlier such as one or both of the maximum and minimum outliers.

The illustrative systems, devices, and methods may preferably behave differently during an initial plurality of time periods. For example, the at least one indication representative of conversion over the first five time periods may not include an aggregate rate of conversion of consumption, and instead, include the rate of conversion calculated, or generated, from a single time period.

As noted, the present invention may include a user interface device. Preferably, the user interface device is a cellular telephone. In another embodiment, the user interface device is a smart watch. Generally, the user interface device may be described as any electronic device including a display for providing a graphical user interface capable of being interacted with by a user. The user interface device includes a communication interface such as, for example, at least a telemetry circuit and an antenna, for bidirectional communication with other devices such as aerosol-generating apparatus, servers, network devices, personal computers, and the like and with other networks such as the internet and the like. More specifically, data and commands may be transmitted and received during uplink or downlink telemetry between the user interface device and other devices and/or networks using the communication interface. In at least one embodiment, the communication interface is a wireless interface using one or more wireless (e.g., radio frequency) data transmission protocols such as, e.g., BLUETOOTH, WI-FI, any protocol in the ultra-high frequency (UHF) band, any protocol in the super high frequency (SHF) band, low frequencies, etc.

The user interface device may include a controller comprising one or more processors (e.g., microprocessors). The one or more processors may operate with associated data storage, or memory, for access to processing programs or routines and one or more types of data that may be employed to carry out the illustrative methods. For example, processing programs or routines stored in data storage may include programs or routines for performing statistics, matrix mathematics, compression algorithms (e.g., data compression algorithms), standardization algorithms, comparison algorithms, or any other processing used to implement the one or more illustrative methods and processes described herein. Further, for example, processing programs or routines stored in data storage may include processes and functions to wirelessly transfer data and commands between the user interface device and an aerosol-generating apparatus. The data storage, or memory, may be further configured to store data related the consumption of the first and second types of aerosol-generating articles, data and formulas related to the generation of the at least one indication representative of the conversion of consumption, and any other data and/or formulas necessary to perform the processes and methods described herein.

In one or more embodiments, the user interface device may be described as being implemented using one or more computer programs executed on one or more programmable processors that include processing capabilities (e.g., microcontrollers, programmable logic devices, etc.), data storage (e.g., volatile or non-volatile memory and/or storage elements), input devices, and output devices. Program code and/or logic described herein may be applied to input data to perform functionality described herein and generate desired output information. The output information may be applied as input to one or more other devices and/or processes as described herein or as would be applied in a known fashion.

The computer program products used to implement the processes described herein may be provided using any programmable language, e.g., a high level procedural and/or object orientated programming language that is suitable for communicating with a computer system. Any such program products may, for example, be stored on any suitable device, e.g., a storage media, readable by a general or special purpose program, controller apparatus for configuring and operating the computer when the suitable device is read for performing the procedures described herein. In other words, at least in one embodiment, the user interface device may be implemented using a non-transitory computer readable storage medium, configured with a computer program, where the storage medium so configured causes the computer to operate in a specific and predefined manner to perform functions described herein.

The exact configuration of the controller of the user interface device is not limiting and essentially any device capable of providing suitable computing capabilities and control capabilities to implement the illustrative methods described herein may be used. In view of the above, it will be readily apparent that the functionality as described in one or more embodiments according to the present invention may be implemented in any manner as would be known to one skilled in the art. As such, the computer language, the controller, or any other software/hardware which is to be used to implement the processes described herein shall not be limiting on the scope of the systems, processes or programs (e.g., the functionality provided by such processes or programs) described herein. The methods and processes described in this disclosure, including those attributed to the systems, or various constituent components, may be implemented, at least in part, in hardware, software, firmware, or any combination thereof. For example, various aspects of the techniques may be implemented within one or more processors, including one or more microprocessors, DSPs, ASICs, FPGAs, CPLDs, microcontrollers, or any other equivalent integrated or discrete logic circuitry, as well as any combinations of such components. When implemented in software, the functionality ascribed to the systems, devices, and methods described in this disclosure may be embodied as instructions on a computer-readable medium such as RAM, ROM, NVRAM, EEPROM, FLASH memory, magnetic data storage media, optical data storage media, or the like. The instructions may be executed by one or more processors to support one or more aspects of the functionality described in this disclosure.

The user interface device may further include a display operatively coupled the controller for the output of data via the display. The display may be further configured to depict and be used as a user interactable, graphical user interface. The graphical user interface and display may comprise a touchscreen. The graphical user interface may be described as being user interactable because the graphical user interface may be configured to allow a user to view and/or manipulate data on the display, to allow a user to interact with user interface device, and the like.

The graphical user interface may be configured to allow a user to enter first and second values representative of consumption of the first and second types of aerosol-generating article and to allow a user to view and interact with the at least one indication representative of conversion of consumption from the first type of aerosol-generating article to the second type of aerosol-generating article. The graphical user interface may be further configured to display textual reinforcement messages to convey encouragement to a user regarding the conversion of consumption from the first type of aerosol-generating article to the second type of aerosol-generating article and/or informational content related to conversion of consumption from the first type of aerosol-generating article to the second type of aerosol-generating article to convey additional information to a user for assistance in conversion of consumption from the first type of aerosol-generating article to the second type of aerosol-generating article. Such textual reinforcement messages and informational content may be generated by the controller of the user interface device based on at least the at least one indication representative of conversion of consumption.

For example, if the conversion of consumption is progressing, a textual reinforcement message noting "You're doing great!" or "Keep it up!" may be generated by the controller and displayed on the graphical user interface. The textual reinforcement message may be displayed on the graphical user interface proximate the at least one indication of conversion of consumption from the first type of aerosol-generating article to the second type of aerosol-generating article. Further, for example, if the conversion of consumption is approaching 100% to indicate that the user is converted, a textual reinforcement message noting "You're almost there!" may be generated by the controller and displayed on the graphical user interface.

Additionally, the informational content related to conversion of consumption from the first type of aerosol-generating article to the second type of aerosol-generating article may include information such as, for example, aerosol-generating apparatus product information (e.g., information regarding various aerosol-generating devices, aerosol-generating substrates, etc.). Further, the informational content may further include links to product stores where users may purchases aerosol-generating apparatus such as aerosol-generating devices, host devices, and aerosol-generating articles. More specifically, the informational content may include information that may enable a user to re-fill their aerosol-generating articles such as online stores, maps to locations where such aerosol-generating articles are available, and the like.

Preferably, the user interface device may be used in conjunction with an illustrative system that includes aerosol-generating apparatus. The aerosol-generating apparatus may include an aerosol-generating device and a host device. The term "aerosol-generating device" refers to a device configured to use, or utilize, an aerosol-generating article that releases volatile compounds to form an aerosol that may be inhaled by a user. The term "aerosol-generating article" refers to an article that comprises a substrate capable of releasing, upon heating, volatile compounds, which may form an aerosol. The aerosols generated from aerosol-generating articles according to the invention may be visible or invisible and may include vapours (for example, fine particles of substances, which are in a gaseous state, that are ordinarily liquid or solid at room temperature) as well as gases and liquid droplets of condensed vapour.

The aerosol-generating device may define a cavity for receiving the aerosol-generating article and may include a heater configured to heat the aerosol-generating substrate of the article to generate aerosol. The aerosol-generating device may include a power supply to at least power the heater and may be configured to be interfaced, or operatively coupled, to the host device. The host device may include an interface to be interfaced, or operably coupled, to the aerosol-generating device to at least charge the power supply of the aerosol-generating device.

The aerosol-generating apparatus may include a controller comprising one or more processors and a communication interface (e.g., wireless communication interface such as a BLUETOOTH wireless protocol interface) to transfer data to and from a user interface device. The controller and communication interface of the aerosol-generating apparatus may be similar to that of the user interface device described herein. The controller comprising one or more processors may be included as part of one or both of the aerosol-generating device and the host device. In other words, the electronic intelligence may part of the aerosol-generating device and/or the host device.

The aerosol-generating apparatus may be configured to communicate, for example, using the communication interface, with the user interface device to transmit data representative of consumption of the second type of aerosol-generating article over a plurality of time periods. For example, the aerosol-generating apparatus may be configured to transmit at least one second value representative of consumption of the second type of aerosol-generating article for each of a plurality of time periods.

The host device may acquire, or gather, usage data from the aerosol-generating device when the aerosol-generating device is docked, or operatively coupled, to the host device. After receiving usage data from the aerosol-generating device, the host device may transmit the data using the communication interface to the user interface device. When the aerosol-generating device comprises the controller and the communication interface, the aerosol-generating device may be configured to communicate with the user interface device directly without use of the host device for data communication.

All scientific and technical terms used herein have meanings commonly used in the art unless otherwise specified. The definitions provided herein are to facilitate understanding of certain terms used frequently herein. As used herein, the singular forms "a", "an", and "the" encompass embodiments having plural referents, unless the content clearly dictates otherwise. As used herein, "or" is generally employed in its sense including "and/or" unless the content clearly dictates otherwise. The term "and/or" means one or all of the listed elements or a combination of any two or more of the listed elements. As used herein, "have", "having", "include", "including", "comprise", "comprising" or the like are used in their open ended sense, and generally mean "including, but not limited to". It will be understood that "consisting essentially of", "consisting of", and the like are subsumed in "comprising," and the like. The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Reference will now be made to the drawings, which depict one or more aspects described in this disclosure. However, it will be understood that other aspects not depicted in the drawing fall within the scope and spirit of this disclosure. Like numbers used in the figures refer to like components, steps and the like. However, it will be understood that the use of a number to refer to a component in a given figure is not intended to limit the component in another figure labeled with the same number. In addition, the use of different numbers to refer to components in different figures is not intended to indicate that the different numbered components cannot be the same or similar to other numbered components.

FIG. 1 is block diagram of an illustrative system 200 for use in generating at least one indication representative of conversion of consumption from a first type of aerosol-generating article to a second type of aerosol-generating article.

FIG. 2 is a schematic sectional view of an illustrative aerosol-generating apparatus 100 includes an aerosol-generating device 102 and a host device 101 configured to interface with the aerosol-generating device 102.

FIGS. 8-9 are charts depicting various scenarios including data representative of consumption of a first type of aerosol-generating article and a second type of aerosol-generating article, indications of conversion of consumption from the first type of aerosol-generating article to the second type of aerosol-generating article, and intermediate data related thereto over a plurality of time periods.

The schematic drawings are not necessarily to scale and are presented for purposes of illustration and not limitation.

Figure 1:
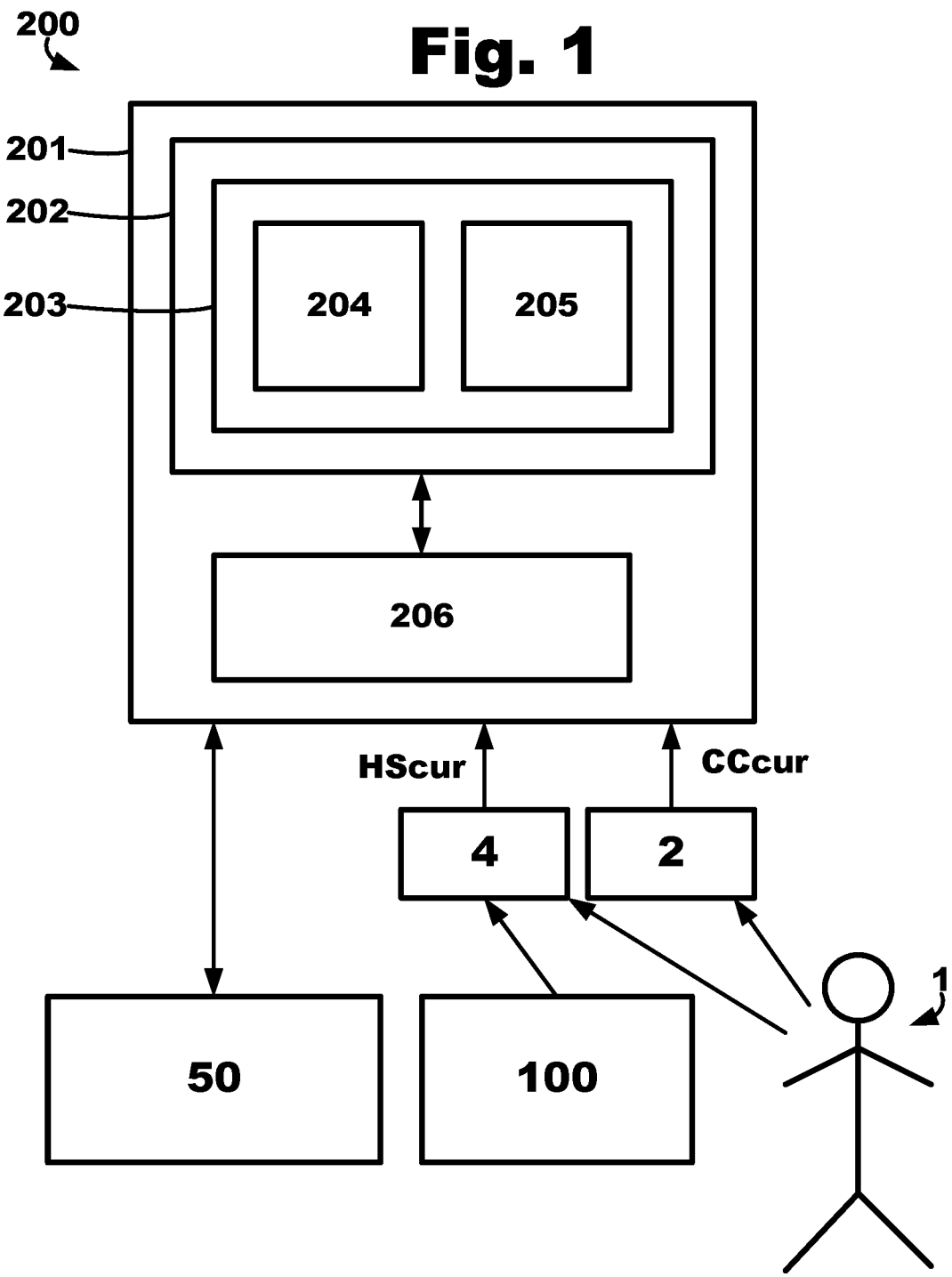

With reference to FIG. 1, a functional scheme of an illustrative method and an illustrative system 200 according to the present invention are depicted. The system 200 includes a user interface device 201 and an aerosol-generating apparatus 100. The user interface device 201 and the aerosol-generating apparatus 100 are physically separate devices. The user interface device 201 is a general purpose computer (in this example, a smart phone or tablet computer) and includes a controller 202 and associated data storage 203. The data storage 203 includes programs and routines 204 such as, for example, programs and routines for the acquisition of data representative of the consumption of the first and second types of aerosol-generating articles, generation of indications of the conversion of consumption from the first type of aerosol-generating article to the second type of aerosol-generating article, and any other programs or routines to execute the illustrative methods and processes described herein. The data storage 203 further includes data 205 such as the data representative of the consumption of the first and second types of aerosol-generating articles, the indications of the conversion of consumption over a plurality of time periods, and the like. The user interface device 201 further includes a display 206 comprising a user-interactable, graphical user interface. The user interface devices includes a communication connection to the Internet, such as a wireless local area network (for example, Wi-Fi) transceiver (not illustrated).

Block 2 represents a first value representative of consumption of a first type of aerosol-generating article and block 4 represents a second value representative of consumption of a second type of aerosol-generating article, each of which may be input into the user interface device 201. According to this embodiment, the second type of aerosol-generating article is a heat stick 104 to be used with an aerosol-generating device 102 of the aerosol-generating apparatus 100, and the first type of aerosol-generating article is a conventional combustion-type cigarette.

Generally, second value 4, HScur, relative to the consumption of the second type aerosol-generating article such as, for example, heat sticks, may be provided by the user 1 to the user interface device apparatus 201 and/or by the aerosol-generating apparatus 100 (e.g., automatically by the aerosol-generating device 102) to the user interface device apparatus 201. Similarly, a first value 2, CCcur, is relative to the consumption of the second type aerosol-generating article such as, for example, conventional cigarettes, may be provided by the user 1 to the user interface device 201. In at least one embodiment, the first value 2, CCcur, is an input data directly input by the user 1 in response to a direct query carried out by the user interface device 201, which may be timely spaced in accordance to a predefined time schedule. Additionally, if the first value 2, CCcur, is not entered by a user, a predicted second data, CCpred, may be generated by the user interface device 201, which is an input data of the conventional cigarette consumption that may be estimated based on a predefined formula.

After first and second values 2, 4 have been provided to the user interface device 201, the user interface device 201 may determine an output data, CS, based on the received values 2, 4. As mentioned, the output data, CS, may include at least one indication of conversion of consumption of the first type of aerosol-generating article to the second type of aerosol-generating article such as, e.g., a rate of the conversion from consuming conventional cigarettes to the usage of the heat sticks. The output data, CS, may be delivered to the user 1 via the display 206 of the user interface device 201. These method steps may be periodically repeated during subsequent time intervals, with the specific aim of informing/educating the users during their journey and converting them to the consumption of reduced-risk product such as, for example, heated-type aerosol-generating articles. Preferably, the collection of first and second values 2, 4, and calculation and delivery of the at least one indication of conversion of consumption (e.g., a conversion rate) are operations performed on a daily basis.

Still with reference to FIG. 1, the user interface device 201 may be a portable device that is configured to establish a connection to an external database serve 50, to transfer/receive data. Data can be transferred and/or received over the Internet via the Wi-Fi transceiver of the user interface device 201. The programs and routines or app in the data storage 203 may be updated over the Internet from a remote server (not illustrated), such as a cloud server. As a result, the app in the data storage 203 can be readily updated.

Figure 2:
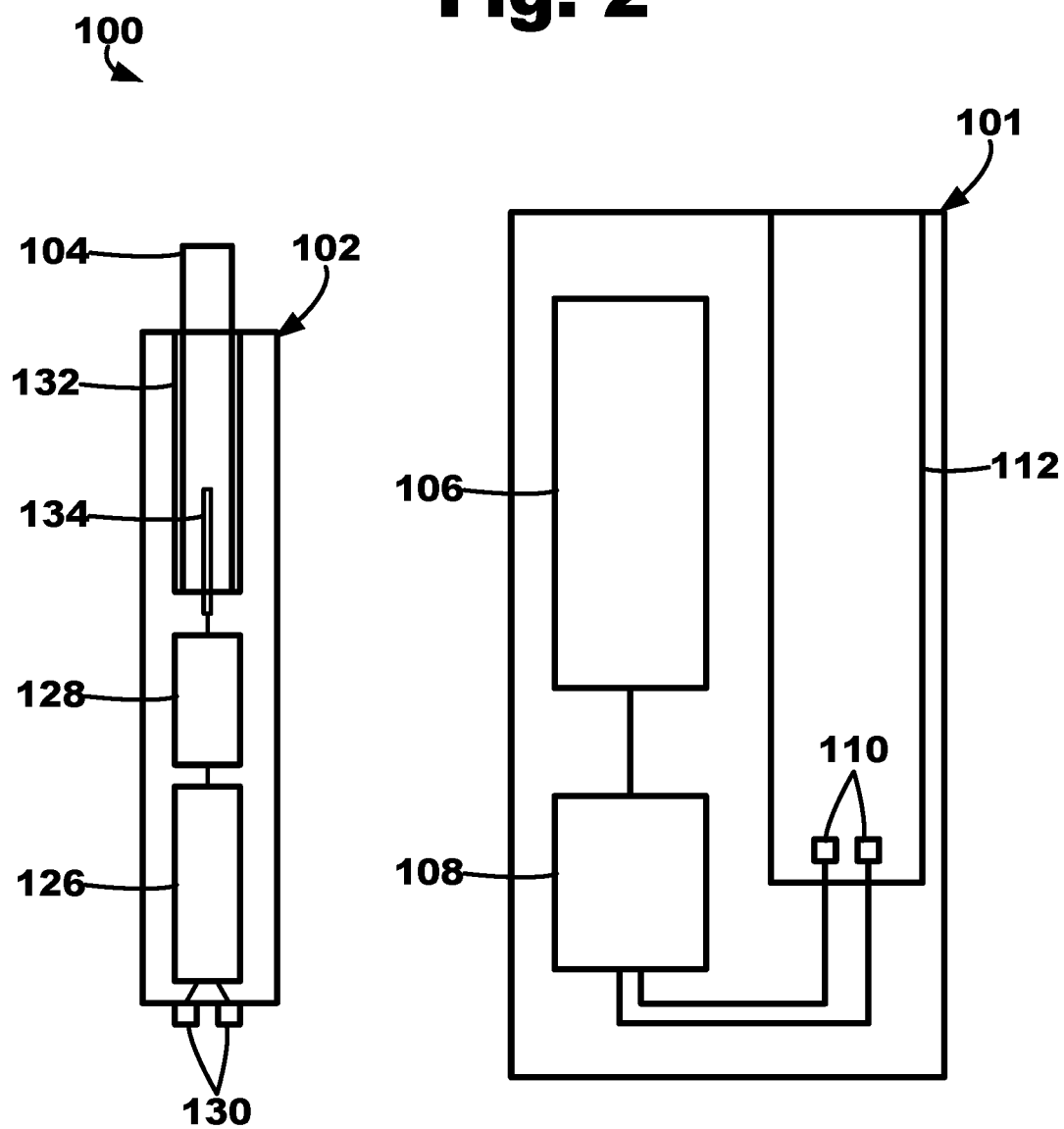

As noted herein, the system 200 may include aerosol-generating apparatus 100 as described with more detail in reference to FIG. 2. Preferably, the aerosol-generating apparatus 100 includes an aerosol-generating device 102 and a host device 101. The aerosol-generating device 102 comprises a cavity 132 for receiving a second type of aerosol-generating article such as a heat stick 104 and a heater 134, which is configured to provide a source of heat to the heat stick 104 thus producing inhalable aerosol. The aerosol-generating device 102 further includes a controller 128 comprising one or more processors and associated memory. The controller 128 may be associated with the heater 134 in order to collect second input consumption data 4, HScur. In fact, advantageously, the controller 128 may sense/record the temperature history of the heater 134 during a smoking occurrence, including, for example, the temperature drops due to user puffs. By collecting all data relative to the temperature history of the heater 134, the controller 128 may detect whether a heat stick 104 has been consumed or not. If so, the control unit 128 updates an internal counter. The controller 128 then keeps a record of the number of heat sticks 104 smoked for each day. The controller 128 may further include a communication interface such as, e.g., a wireless communication interface to, for example, communicate with the user interface device 201 and/or host device 101. The communication interface of the controller 128 may preferably comprise a BLUETOOH interface. The aerosol-generating device 102 further comprises a power supply 126 and power and data interface ports 130.

The host device 101 includes a cavity 112 configured to host the aerosol-generating device 102 to recharge its power supply 126 via the power and interface ports 130. Preferably, the power supply 126 of the aerosol-generating device 102 may be designed to supply sufficient power for a one smoking experience, such that the user after consumption of a heat stick 104 has to re-insert the aerosol-generating device 102 into the host device 101 to recharge its battery 126 via the power and data interface ports 110 of the host device 101.

The host device 101 includes a controller 108 comprising one or more processors and associated with a communication interface unit 106, which interacts with the controller 128 of the aerosol-generating device 102 to exchange/store data collected such as, for example, the daily amount, or number, of heat stick consumed, HScur, when the aerosol-generating device 102 and the host devices 101 are electrically coupled (e.g., when the aerosol-generating device 102 is docked, via wireless communication, etc.). The communication interface unit 106, in turn, may be configured to exchange collected data such as second input data 4, HScur, to/from the user interface device 201. Advantageously, communication interface unit 106 has a wireless communication module, preferably comprising a BLUETOOH interface. This is a low power interface.

In this way, the number of heat sticks consumed per day, HScur, is stored into the system 200, with no action on the user side, and it is communicated to the user interface device 201 (for calculation of the output data, that is conversion rate) as explained in the following with reference to different practical scenarios in FIGS. 8-9.

Figure 3:
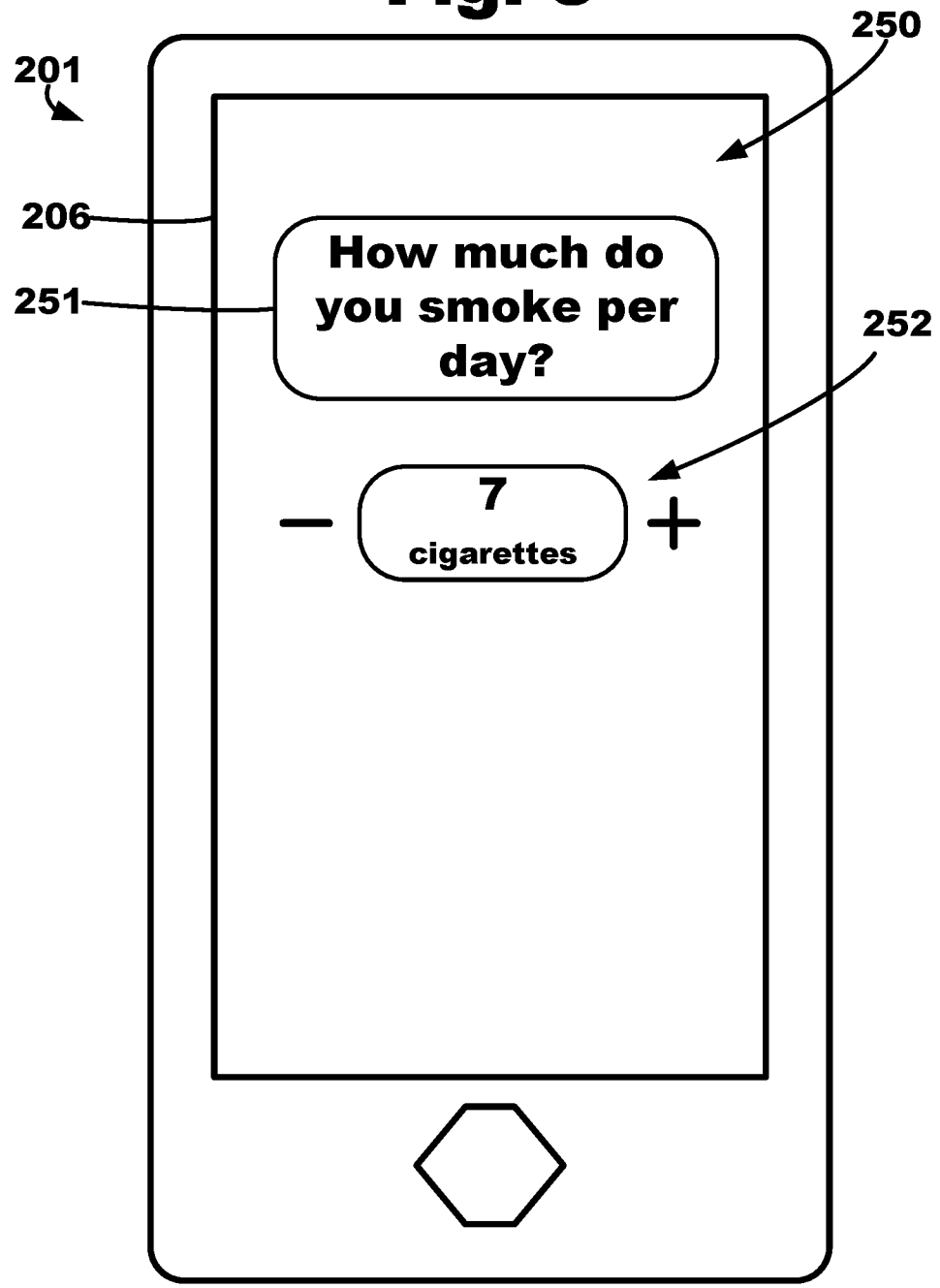
FIG. 3 is a view of an illustrative graphical user interface 250 for use with a user interface device 201 depicting an input dialog.
Figure 4:
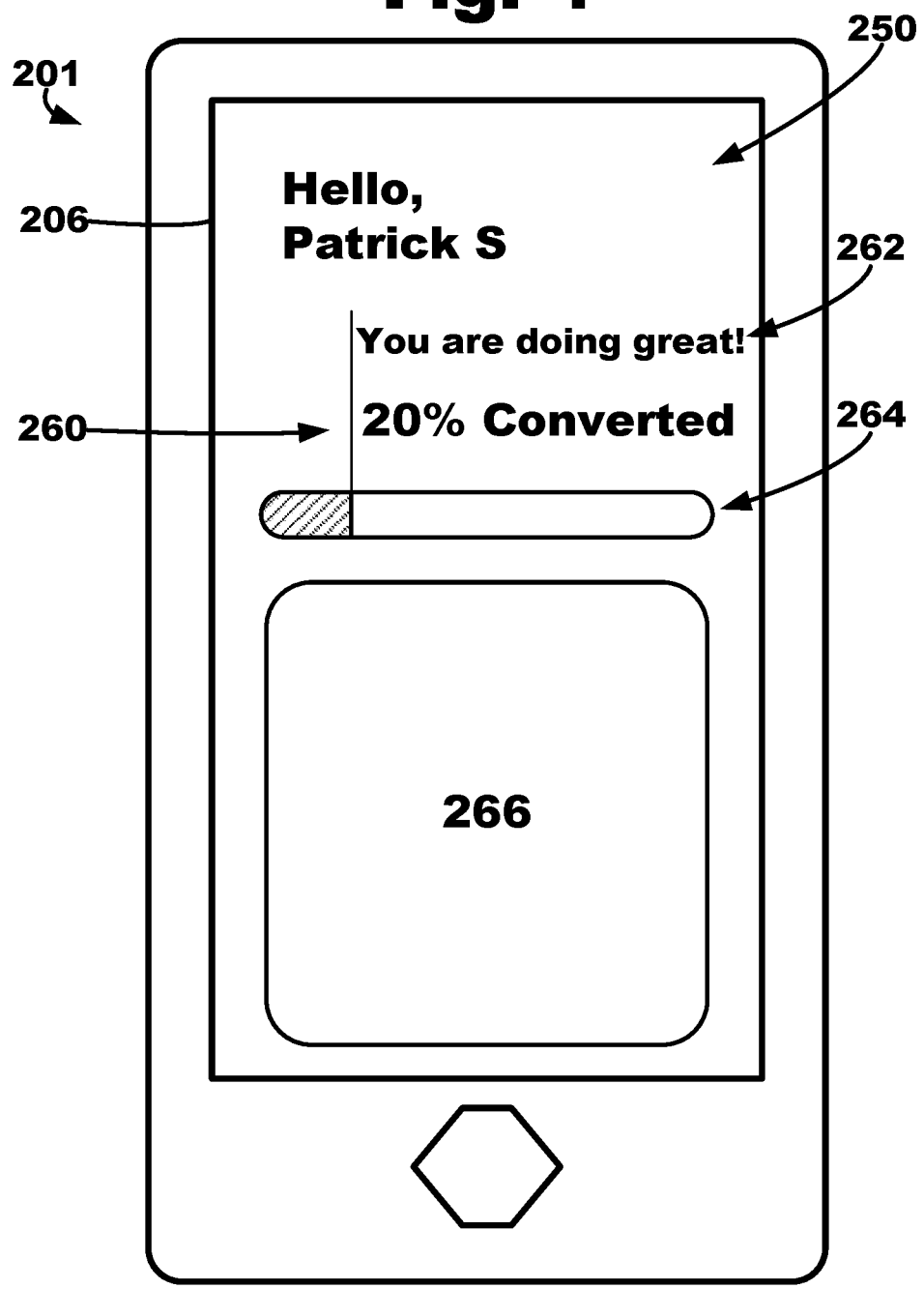
FIGS. 4-6 are views of an illustrative graphical user interface 250 for use with a user interface device 201 depicting indications representative of conversion of consumption from a first type of aerosol-generating article to a second type of aerosol-generating article.
Figure 5:
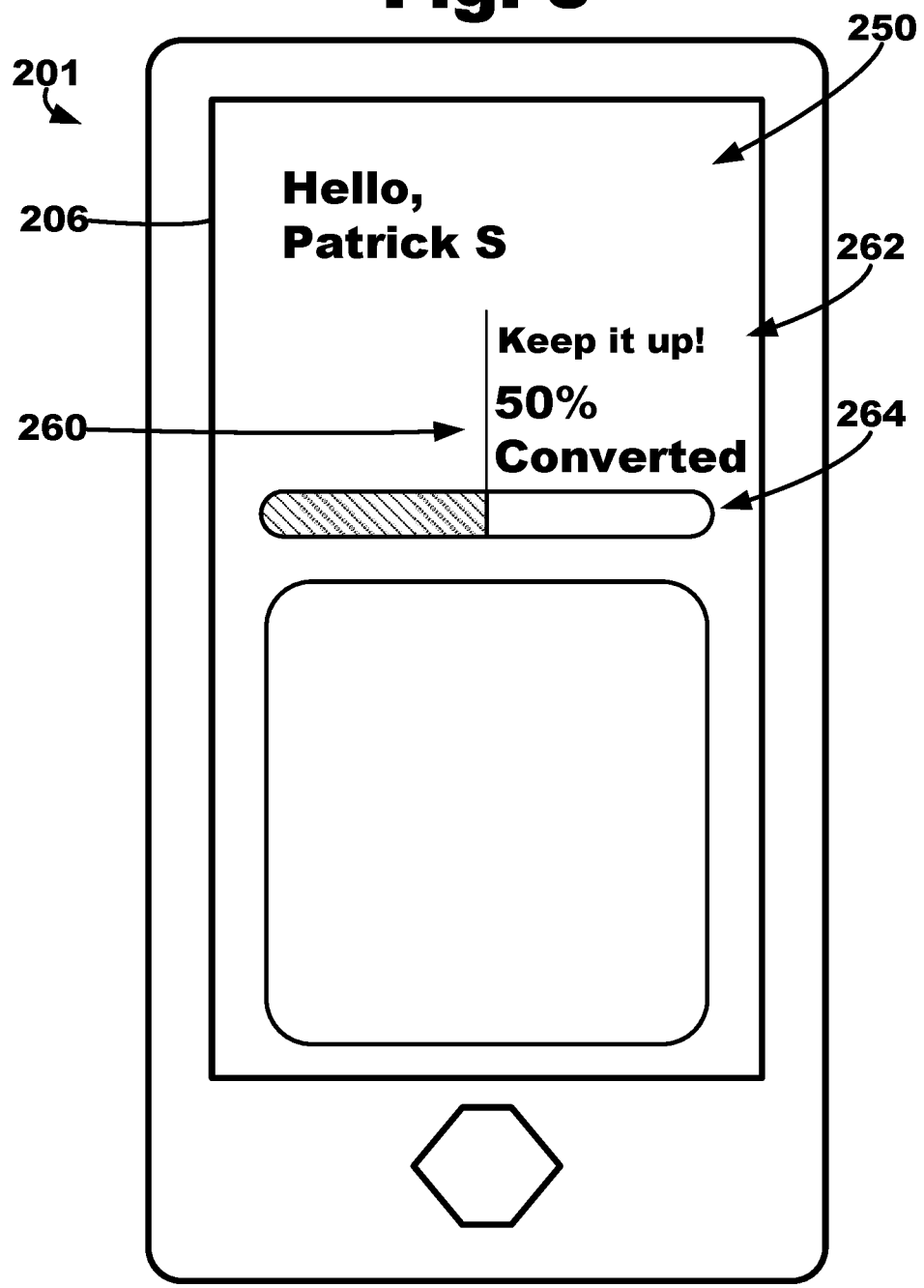
Figure 6:
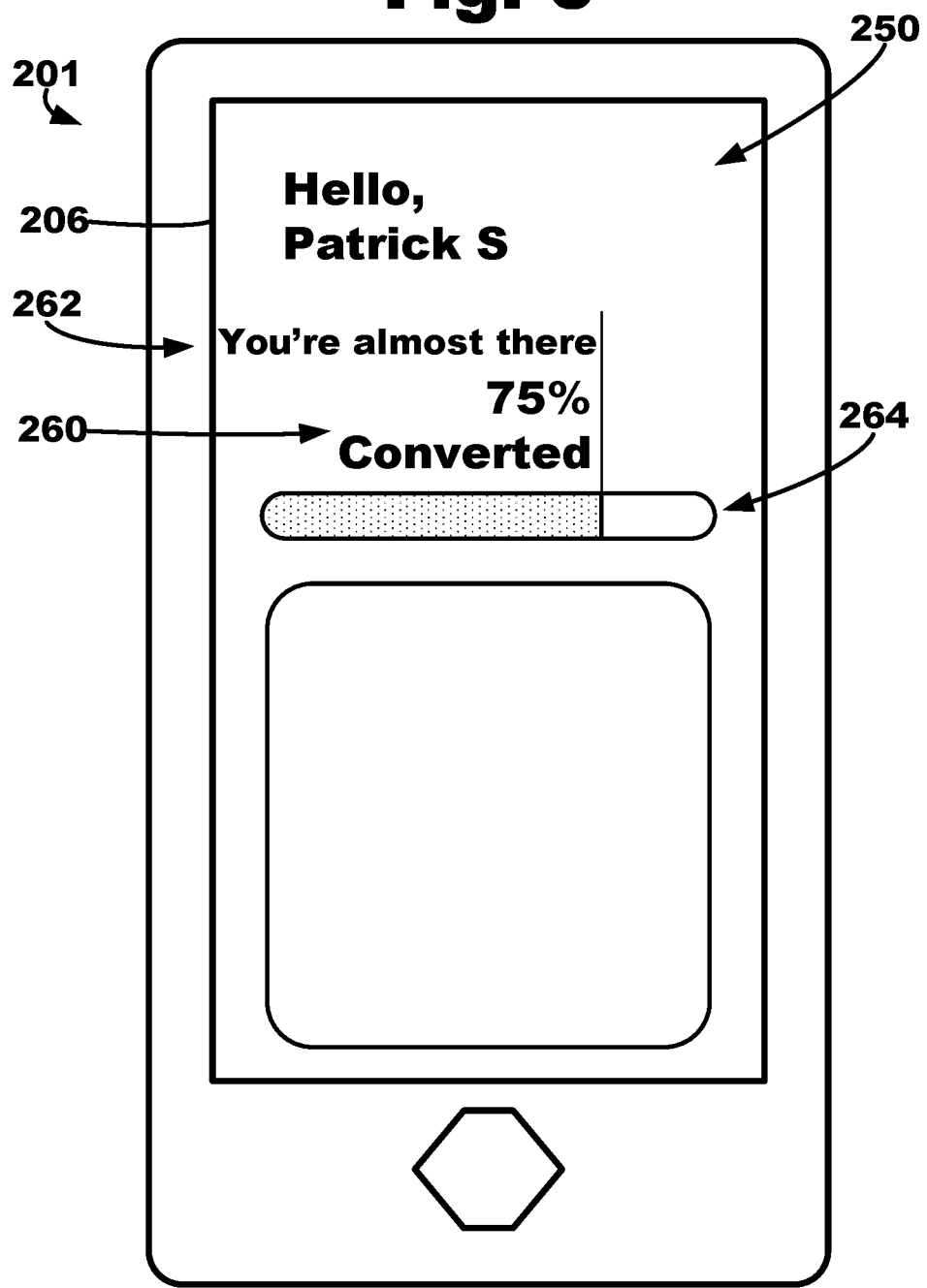

The illustrative user interface device 201 including a display 206 depicting a graphical user interface 250 is shown in FIGS. 3-6. In FIG. 3, the graphical user interface 250 includes a query 251 requesting the user to enter, or input, an amount of conventional cigarettes the user smokes per day and a dialog 252 including selectable buttons to increase or decrease an amount of cigarettes that user has consumed per day. In FIGS. 4-6, the graphical user interface 250 includes two indications of conversion of consumption from conventional cigarettes to heated-type aerosol-generating articles 260, 264, textual reinforcement messages 262 to convey encouragement to a user regarding the conversion of consumption, and informational content 266 related to conversion of consumption to convey additional information to a user for assistance in conversion of consumption. The first indication 260 of conversion of consumption from conventional cigarettes to heated-type aerosol-generating articles comprises a rate, or percentage, of conversion of consumption from conventional cigarettes to heated-type aerosol-generating articles ("20% Converted" in FIG. 4, "50% Converted" in FIG. 4, and "75% Converted" in FIG. 5). The second indication 264 of conversion of consumption from conventional cigarettes to heated-type aerosol-generating articles comprises bar-type graph representative of the rate, or percentage, of conversion of consumption from conventional cigarettes to heated-type aerosol-generating articles. In FIG. 4, the textual reinforcement message 262 reads "You are doing great!" In FIG. 5, the textual reinforcement message 262 reads "Keep in up!" In FIG. 6, the textual reinforcement message 262 reads "You're almost there."

Generally, the illustrative methods according to the invention may be implemented by means of a software application downloaded, from the user 1, on the user interface device 201 (typically a mobile phone or tablet) from the server database 50. The user 1 may perform a first login once the application is downloaded and may be requested to insert their credentials along with initial data relative to their consumption habits of first and second type of smoking articles such as, e.g., shown in FIG. 3. Said differently, on day 1, when a user starts their conversion journey (which may correspond to the purchase of an illustrative aerosol-generating system), the user may be asked to insert data of their average consumption of heat sticks (number of heat sticks per day) and their average consumption of conventional cigarette (number of conventional cigarette per day) as shown in FIG. 3. Normally the initial number of heat sticks per day is zero, unless the user is already smoking heat sticks at the first log in.

The second value 4, for example, such as daily number of smoked heat sticks, is stored within the aerosol generating apparatus 100, and communicated to the user interface device 201 for carrying out the calculation of the conversion rate every time the user logs in into the application and performs a sync between the aerosol-generating apparatus 100 and the user interface device 201. During the synchronization, the heat stick consumption data is transferred from the aerosol-generating apparatus 100 to the user interface device 201. Therefore, different scenarios are possible depending on the user behavior in terms of how often the users sync their aerosol-generating apparatus 100 to their user interface devices 201.

FIGS. 8-9 are charts depicting various scenarios including data representative of consumption of a first type of aerosol-generating article and a second type of aerosol-generating article, indications of conversion of consumption from the first type of aerosol-generating article to the second type of aerosol-generating article, and intermediate data related thereto over a plurality of time periods. In this first scenario of FIG. 8, the user is very compliant and syncs their aerosol-generating system daily.

In this example, at a first log in the user inserts the initial data:

$HS\text{init}=0$ $CC\text{init}=18$

Therefore, the user is new to smoking heat sticks and appears to be quite a passionate smoker of conventional cigarette (i.e., 18 per day). Day 1 passes and a certain number of heat sticks and conventional cigarettes are smoked. The number of heat sticks are stored in the aerosol-generating system as explained herein. During day 2, the user logs in, and input data is obtained pertaining to the previous day 1. In particular, heat stick consumption (e.g., a number of heat sticks smoked on day 1), HScur, is delivered by synchronization of the aerosol-generating apparatus 100 and the user interface device 201, whilst the consumption of convention cigarette CCpred is estimated based on a predefined formula.

In particular, the formula for calculation of CCpred of day 1 is based on the HScur of day 1 and the constant first value CCinit and the constant second value HSinit initially provided at the first log in.

$CC\text{pred}=HS\text{init}+CC\text{init}-HS\text{cur}$

In other terms, it is estimated that the number of smoked heat sticks will replace an equal number of conventional cigarette. Therefore, for day 1, first and second input data collected are:

$HS\text{cur}=10$ $CC\text{pred}=8$

Based on this input, the apparatus calculates the rate of conversion from conventional cigarettes to heat sticks, CS, based on the following general formula:

$CS=HS/(HS+CC)$

Now, since there is a delay of a day between when the effective consumption of smoking articles is performed (heat sticks and conventional cigarettes) and when the associated data is transferred to the application, it may be useful to distinguish between output data, CSraw and CSactual. In general, CSraw may be the conversion rate delivered on a particular day, but which actually refers to the consumption of the day before. In general terms, only on a generic day (n), input data of day (n=1) can be complete and hence processed. On day 1, CSraw is calculated based on HSinit as follows:

$CS\text{raw (day 1)}=HS\text{init}/HS\text{init}+CC\text{init}=0$ (in this case $HS\text{init}$ is zero)

On day 2, CSraw is calculated based on the input data relative to day 1:

$CS\text{raw (day 2)}=HS\text{cur (day 1)}/HS\text{cur (day 1)}+CC\text{pred (day 1)}$ Whilst CSactual on day 1 is actually the conversion rate based on the consumption of day 1:

$CS\text{actual (day 1)}=HS\text{cur (day 1)}/HS\text{cur (day 1)}+CC\text{pred (day 1)}$ So it is now clear that in general:

CSraw (day $n$)=CSactual (day $n-1$)

With the logic explained above, for every day CSraw and CSactual output values are calculated based on first and second input data. However, this may not always true for scenarios where the user is compliant and syncs their device daily. Moreover, the daily number of convention cigarettes smoked is not always predicted, but sometimes it is directly requested to be input by the user (which, when inputted, is indicated as CCcur). The requests are carried out based on a specific predetermined time schedule. When CCcur is available, that is the input data which is used in calculation.

Figure 7:
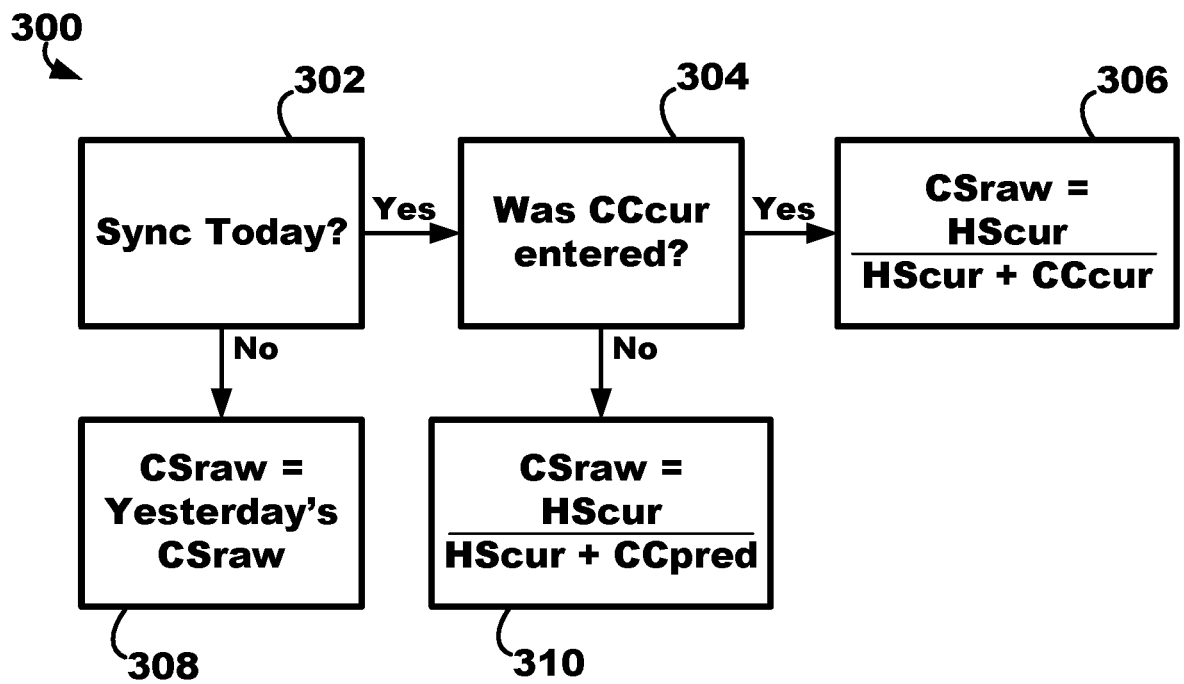
FIG. 7 is a flow chart of an illustrative method of generating an indication of conversion of consumption from a first type of aerosol-generating article to a second type of aerosol-generating article.

A flow chart of an illustrative method 300 of generating an indication of conversion of consumption, CSraw, from a first type of aerosol-generating article to a second type of aerosol-generating article is depicted in FIG. 7. As shown, the method first checks if synchronization 302 has occurred between the aerosol-generating apparatus 100 and the user interface device 201, and thus, determining if a second value representative of the consumption of the second type of aerosol-generating article, HScur, has been downloaded from the aerosol-generating apparatus 100 to the user interface device 201. If no synchronization 302 has occurred on a particular day, then the indication of conversion of consumption, CSraw, may not be accurate if calculated, and thus, the indication of conversion of consumption, CSraw, is set equal to the previous day's, or yesterday's, output value 308. If synchronization 302 has occurred on a particular day, then the method 300 may check 304 if a first value representative of the consumption of the first type of aerosol-generating article, CCcur, has been entered by a user. If no first value 304 has been entered on a particular day, then the method 300 may use a predicted second value, CCpred, which may be estimated as described herein, to calculate the indication of conversion of consumption, CSraw. In this situation, the indication of conversion of consumption, CSraw, may calculated 310 as being equal to the second value, HScur, divided by the sum of the second value, HScur, and the first value, CCpred. If a first value 304 has been entered on a particular day, then the method 300 may use the entered second value, CCcur, such that CSraw, may calculated 306 as being equal to the second value, HScur, divided by the sum of the second value, HScur, and the first value, CCcur.

Once CSraw is obtained, it is transformed into CSorig as now explained. Generally, CSorig is the data used to serve behavioral content. Preferably CSorig is a"trimmed average" of CSraw and may be calculated as follows: from day 1 to day 5, CSorig=CSraw; and from day 6 on, CSorig may be calculated taking multiple CSraw values of the last five days, deleting minimum and maximum values and measuring the average of the remaining three.

Further, the rate of conversion of consumption may be categorized into stages and turned into coded information as follows: <33%=Low; 33 to 66%=Medium; 66 to 95%=High; and >95%=Converted. Each of the categorizations/coded information are indicated in the tables of FIGS. 8-9 proximate to the corresponding output data.

The second scenario depicted in the chart of FIG. 8 is different that the first scenario of FIG. 9 in that user is not very compliant and does not sync the aerosol-generating apparatus 100 daily with the user interface device 201. In this scenario, when the user does not sync, the apparatus will not know the first input of the heat stick consumption (number of heat sticks smoked the previous day). In this case, CSraw is computed equal to the one of the day before.

This is clearly indicated in the second scenario of chart of FIG. 9. The reason why a conversion rate, CSraw, is calculated and delivered to the user even when the user does not sync his device (thus does not deliver the input data) is because, for example, the conversion rate may be useful to be provided to the user daily even when user does not provide input data. As previously outlined, CSorig is the output based on which behavioral content is delivered and is calculated from CSraw. In the second scenario, it is possible to appreciate the fluctuations of CSraw from CSactual (in particular, the conversion rate may be given to the user in terms of the categorizations/coded information such as, for example, low, medium, high and converted) for a user who does not sync daily.

Thus, systems, devices, and methods for use in conversion from a first type of aerosol-generating article to a second type of aerosol-generating article are described. Various modifications and variations of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are apparent to those skilled in the electrical arts, computer arts and aerosol generating article manufacturing or related fields are intended to be within the scope of the following claims.

According to a further aspect of the invention, the conversion can be computed from an e-cigarette to heat sticks. Here, the rationale of the computation is exactly as previously described. In this aspect of the invention it is important to understand how large a volume of e-liquid is equivalent to the smoking of a single combustible cigarette. If EC(equivalent) is the volume of e-liquid corresponding to one combustible cigarette, we can define it as a unitary volume, which is used for computing the conversion towards heat sticks in accordance with the description above. Similarly as for conversion from combustible cigarettes to heat sticks, we can define EC(init) as the initial EC(equivalent) which means the volume of liquid initially used (at the beginning) calculated in number of equivalent combustible cigarettes.

EC(cur)=subsequent EC(equi) readings. A way to calculate EC(cur) is to let the user input to the interface device how long a given volume of e-liquid lasts, from which is calculated the average volume consumption per day and therefore the number of equivalent combustible cigarettes (as above described).

EC can also be predicted EC(pred), with a similar formula as for other examples. In yet another example, a conversion from using two different aerosol-generating articles, e.g. e-cigs and combustible cigarettes (dual use of conventional cigarettes and e-cigs is occurring) to heat sticks, may be computed.

This may be done as described above with reference to conversion from a first article to second article, with the difference that the conversion ratio will be calculated using the sum of the consumption of both e-cigs and combustible cigarettes.

The invention claimed is:
1. A system comprising:
an aerosol-generating apparatus configured to use a second type of aerosol generating article to generate aerosol, wherein the aerosol-generating apparatus comprises:
an apparatus communication interface to transfer data to and from a user interface device; and an apparatus controller comprising one or more processors, wherein the apparatus controller is configured to:
  determine at least one second value representative of consumption of the second type of aerosol-generating article over at least one time period using the aerosol-generating apparatus, and
  transmit the at least one second value representative of consumption of the second type of aerosol-generating article over the at least one time period to the user interface device; and
a user interface device comprising:
  a display comprising a graphical user interface configured to present at least one indication representative of conversion of consumption from a first type of aerosol-generating article to the second type of aerosol-generating article;
  a device communication interface to receive the at least one second value representative of consumption of the second type of aerosol-generating article during telemetry between the user interface device and the aerosol-generating apparatus; and
  a device controller comprising one or more processors and operably coupled to the display and the device communication interface of the user interface device, wherein the device controller is configured to:
    receive the at least one second value representative of consumption of the second type of aerosol-generating article using the device communication interface of the user interface device during telemetry between the user interface device and the aerosol-generating apparatus,
    generate the at least one indication representative of conversion of consumption from the first type of aerosol-generating article to the second type of aerosol-generating article based on at least one first value representative of consumption of the first type of aerosol-generating article over the at least one time period and the at least one second value representative of consumption of the second type of aerosol-generating article over the at least one time period, wherein the first type of aerosol-generating article is different than the second type of aerosol-generating article, and
    display, on the graphical user interface, the at least one indication representative of conversion of consumption from the first type of aerosol-generating article to the second type of aerosol-generating article.

2. The system of claim 1, wherein the aerosol-generating apparatus comprises:
  an aerosol-generating device comprising a power supply; and
  a host device comprising an interface to be operably coupled to the aerosol-generating device to at least recharge the power supply of the aerosol-generating device.

3. The system of claim 2, wherein the host device comprises the apparatus communication interface and the apparatus controller.

4. The system of claim 2, wherein the apparatus controller is further configured to receive consumption data associated with the at least one second value representative of consumption of the second type of aerosol-generating article over the at least one time period from the aerosol-generating device when the aerosol-generating device is operably coupled to the host device.

5. The system of claim 2, wherein the aerosol-generating device comprises the apparatus communication interface and the apparatus controller.

6. The system of claim 1, wherein generating the at least one indication representative of conversion of consumption from the first type of aerosol-generating article to the second type of aerosol-generating article comprises generating a rate of conversion of consumption from the first type of aerosol-generating article to the second type of aerosol-generating article.

7. The system of claim 1, wherein the at least one second value representative of consumption of the second type of aerosol-generating article over the at least one time period comprises:
  an initial second value representative of consumption of the second type of aerosol-generating article over an initial time period of the at least one time period, and
  a plurality of subsequent second values representative of consumption of the second type of aerosol-generating article over a plurality of subsequent time periods of the at least one time period; and
wherein the at least one first value representative of consumption of the first type of aerosol-generating article over the at least one time period comprises:
  an initial first value representative of consumption of the first type of aerosol-generating article over the initial time period, and
  a plurality of subsequent first values representative of consumption of the first type of aerosol-generating article over the plurality of subsequent time periods,
  wherein a generated subsequent first value of the plurality of subsequent first values is generated based on the initial first value, the initial second value, and a subsequent second value of the plurality of subsequent second values corresponding to the generated subsequent first value.

8. The system of claim 7, wherein the initial first value is input by a user.

9. The system of claim 7, wherein generating the at least one indication representative of conversion of consumption from the first type of aerosol-generating article to the second type of aerosol-generating article comprises generating a rate of conversion of consumption from the first type of aerosol-generating article to the second type of aerosol-generating article by dividing a current subsequent second value of the plurality of subsequent second values by a sum of the current subsequent second value and a current subsequent first value of the plurality of subsequent first values.

10. The system of claim 1, wherein the at least one indication representative of conversion of consumption from the first type of aerosol-generating article to the second type of aerosol-generating article comprises an aggregate rate of conversion of consumption from the first type of aerosol-generating article to the second type of aerosol-generating article based on at least a rolling average of a plurality of previous rates of conversion of consumption from the first type of aerosol-generating article to the second type of aerosol-generating article from a plurality of previous time periods.

11. The system of claim 1, wherein the at least one indication representative of conversion of consumption from the first type of aerosol-generating article to the second type of aerosol-generating article comprises a graphical indication representative of conversion of consumption from the first type of aerosol-generating article to the second type of aerosol-generating article.

12. The system of claim 1, wherein the device controller is further configured to execute generating a textual reinforcement message based on at least the at least one indication representative of conversion of consumption to convey encouragement to a user to regarding the conversion of consumption from the first type of aerosol-generating article to the second type of aerosol-generating article.

13. A method comprising:
providing at least one first value representative of consumption of a first type of aerosol-generating article over at least one time period to a user interface device;
generating, using an aerosol-generating apparatus, at least one second value representative of consumption of a second type of aerosol-generating article over the at least one time period, wherein the first type of aerosol-generating article is different than the second type of aerosol-generating article;
transmitting, using an aerosol-generating apparatus, the at least one second value representative of consumption of the second type of aerosol-generating article over the at least one time period from the aerosol-generating apparatus to the user interface device during telemetry therebetween; and
generating, using the user interface device, at least one indication representative of conversion of consumption from the first type of aerosol-generating article to the second type of aerosol-generating article based on the at least one first value and the at least one second value.

14. The method of claim 13, wherein generating the at least one indication representative of conversion of consumption from the first type of aerosol-generating article to the second type of aerosol-generating article comprises generating a rate of conversion of consumption from the first type of aerosol-generating article to the second type of aerosol-generating article.

15. The method of claim 13, wherein the at least one second value representative of consumption of the second type of aerosol-generating article over the at least one time period comprises:
an initial second value representative of consumption of the second type of aerosol-generating article over an initial time period of the at least one time period, and
a plurality of subsequent second values representative of consumption of the second type of aerosol-generating article over a plurality of subsequent time periods of the at least one time period; and
wherein the at least one first value representative of consumption of the first type of aerosol-generating article over the at least one time period comprises:
an initial first value representative of consumption of the first type of aerosol-generating article over the initial time period, and
a plurality of subsequent first values representative of consumption of the first type of aerosol-generating article over the plurality of subsequent time periods,
wherein a generated subsequent first value of the plurality of subsequent first values is generated based on the initial first value, the initial second value, and a subsequent second value of the plurality of subsequent second values corresponding to the generated subsequent first value.

16. The method of claim 15, wherein the initial first value is input by a user.

17. The method of claim 15, wherein generating the at least one indication representative of conversion of consumption from the first type of aerosol-generating article to the second type of aerosol-generating article comprises generating a rate of conversion of consumption from the first type of aerosol-generating article to the second type of aerosol-generating article by dividing a current subsequent second value of the plurality of subsequent second values by a sum of the current subsequent second value of the plurality of subsequent second values and a current subsequent first value of the plurality of subsequent first values.

18. The method of claim 13, wherein the at least one indication representative of conversion of consumption from the first type of aerosol-generating article to the second type of aerosol-generating article comprises an aggregate rate of conversion of consumption from the first type of aerosol-generating article to the second type of aerosol-generating article based on at least a rolling average of a plurality of previous rates of conversion of consumption from the first type of aerosol-generating article to the second type of aerosol-generating article from a plurality of previous time periods.

19. The method of claim 13, wherein the at least one indication representative of conversion of consumption from the first type of aerosol-generating article to the second type of aerosol-generating article comprises a graphical indication representative of conversion of consumption from the first type of aerosol-generating article to the second type of aerosol-generating article.

20. The method of claim 13, wherein the method further comprises generating a textual reinforcement message based on at least the at least one indication representative of conversion of consumption to convey encouragement to a user to regarding the conversion of consumption from the first type of aerosol-generating article to the second type of aerosol-generating article.

* * * * *